US012785922B2

(12) United States Patent
Kitagawa et al.

(10) Patent No.: US 12,785,922 B2
(45) Date of Patent: Nov. 3, 2026

(54) VEHICLE-MOUNTED APPARATUS, TIME SYNCHRONIZATION METHOD, AND TIME SYNCHRONIZATION PROGRAM

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Kazuki Kitagawa, Mie (JP); Hitoshi Kono, Mie (JP); Tadashi Matsumoto, Mie (JP); Kazuyuki Inoue, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 17 days.

(21) Appl. No.: 18/994,607

(22) PCT Filed: Jun. 14, 2023

(86) PCT No.: PCT/JP2023/022060

§ 371 (c)(1),
(2) Date: Jan. 15, 2025

(87) PCT Pub. No.: WO2024/018787

PCT Pub. Date: Jan. 25, 2024

(65) Prior Publication Data

US 2026/0019228 A1 Jan. 15, 2026

(30) Foreign Application Priority Data

Jul. 20, 2022 (JP) ................................ 2022-115540

(51) Int. Cl.
*H04L 7/00* (2006.01)

(52) U.S. Cl.
CPC .................................. *H04L 7/0033* (2013.01)

(58) Field of Classification Search
CPC ......... H04L 7/00; H04L 7/0033; H04L 12/28; H04J 3/0667
See application file for complete search history.

(56) References Cited

U.S. PATENT DOCUMENTS

2015/0134764 A1* 5/2015 Noebauer ............. H04L 7/0037 709/208
2015/0346760 A1 12/2015 Kishiro et al.
(Continued)

FOREIGN PATENT DOCUMENTS

JP H11-212926 A 8/1999
JP 2016-005214 A 1/2016
(Continued)

OTHER PUBLICATIONS

International Search Report issued on Sep. 5, 2023 for WO 2024/018787 A1 (4 pages).

*Primary Examiner* — David B Lugo
(74) *Attorney, Agent, or Firm* — LICA, Inc.

(57) ABSTRACT

A vehicle-mounted apparatus includes: a transmission processing unit configured to perform a transmission process for transmitting, to another vehicle-mounted apparatus, first time synchronization information and second time synchronization information that includes a transmission time at which the first time synchronization information is transmitted, at a predetermined transmission cycle; and a correction unit configured to perform a correction process for correcting the transmission time to be included in the second time synchronization information in a current transmission process, based on a time difference between a current time at the vehicle-mounted apparatus and a previous transmis- (Continued)

sion time, the previous transmission time being the transmission time in the previous transmission process, to a corrected transmission time obtained by adding, to the previous transmission time, the transmission cycle and a value obtained by splitting the time difference.

6 Claims, 9 Drawing Sheets

(56) References Cited

U.S. PATENT DOCUMENTS

| | | | | |
|---|---|---|---|---|
| 2020/0084372 | A1* | 3/2020 | Xie | H04N 7/181 |
| 2020/0195619 | A1 | 6/2020 | Iwata et al. | |
| 2020/0259579 | A1 | 8/2020 | Yamasaki | |
| 2021/0289328 | A1 | 9/2021 | Yan | |
| 2023/0247573 | A1* | 8/2023 | Qin | H04W 56/0015 370/350 |
| 2023/0262630 | A1* | 8/2023 | Woolsey | H04W 56/009 370/350 |
| 2024/0031123 | A1 | 1/2024 | Kitagawa et al. | |

FOREIGN PATENT DOCUMENTS

| | | | |
|---|---|---|---|
| JP | 2018-112425 | A | 7/2018 |
| JP | 2018-196038 | A | 12/2018 |
| JP | 2020-126317 | A | 8/2020 |
| JP | 2020-129778 | A | 8/2020 |
| JP | 2020-167616 | A | 10/2020 |
| JP | 2022-030461 | A | 2/2022 |
| WO | 2014/199729 | A1 | 12/2014 |

* cited by examiner

VEHICLE-MOUNTED APPARATUS, TIME SYNCHRONIZATION METHOD, AND TIME SYNCHRONIZATION PROGRAM

CROSS REFERENCE TO RELATED APPLICATIONS

This application is a national phase of PCT application No. PCT/JP2023/022060, filed on 14 Jun. 2023, which claims priority from Japanese patent application No. 2022-115540, filed on 20 Jul. 2022, all of which are incorporated herein by reference.

TECHNICAL FIELD

The present disclosure relates to a vehicle-mounted apparatus, a time synchronization method, and a time synchronization program.

BACKGROUND

JP 2020-167616 A (Patent Document 1) discloses the time synchronization system described below. That is, in a time synchronization system where the time at a slave is synchronized with a grandmaster clock, an apparatus that functions as the grandmaster, one or more apparatuses that function as adjacent repeaters, and one or more apparatuses that function as terminals are connected via a network. The grandmaster transmits a signal including a clock on the network, and each terminal corrects its time based on the clock, sums a time correction amount with a correction integrated value a held by that terminal and, if a exceeds a predetermined threshold, transmits a grandmaster abnormality notification message onto the network. Each adjacent repeater corrects its own time based on the clock, sums the time correction amount into the a value it holds, and if a exceeds a predetermined threshold and a grandmaster abnormality notification message has been received from one or more apparatuses under its control, transmits a message on the network indicating that a grandmaster should be reassigned.

PRIOR ART DOCUMENT

Patent Document

Patent Document 1: JP 2020-167616 A
Patent Document 2: JP 2020-129778 A
Patent Document 3: JP 2020-126317 A
Patent Document 4: JP 2018-112425 A
Patent Document 5: JP 2016-005214 A
Patent Document 6: JP 2018-196038 A

SUMMARY OF THE INVENTION

A vehicle-mounted apparatus according to an aspect of the present disclosure includes: a transmission processing unit configured to perform a transmission process for transmitting, to another vehicle-mounted apparatus, first time synchronization information and second time synchronization information including a transmission time at which the first time synchronization information is transmitted, at a predetermined transmission cycle; and a correction unit configured to perform a correction process for correcting the transmission time to be included in the second time synchronization information in a current transmission process, based on a time difference between a current time at the vehicle-mounted apparatus and a previous transmission time, the previous transmission time being the transmission time in the previous transmission process, to a corrected transmission time obtained by adding, to the previous transmission time, the transmission cycle and a value obtained by splitting the time difference.

The above aspect of the present disclosure can be realized not only as a vehicle-mounted apparatus equipped with the characteristic processing unit described above and may be realized by a semiconductor integrated circuit that realizes part or all of the vehicle-mounted apparatus or by a system including such a vehicle-mounted apparatus.

DETAILED DESCRIPTION TO EXECUTE THE INVENTION

Figure 1:
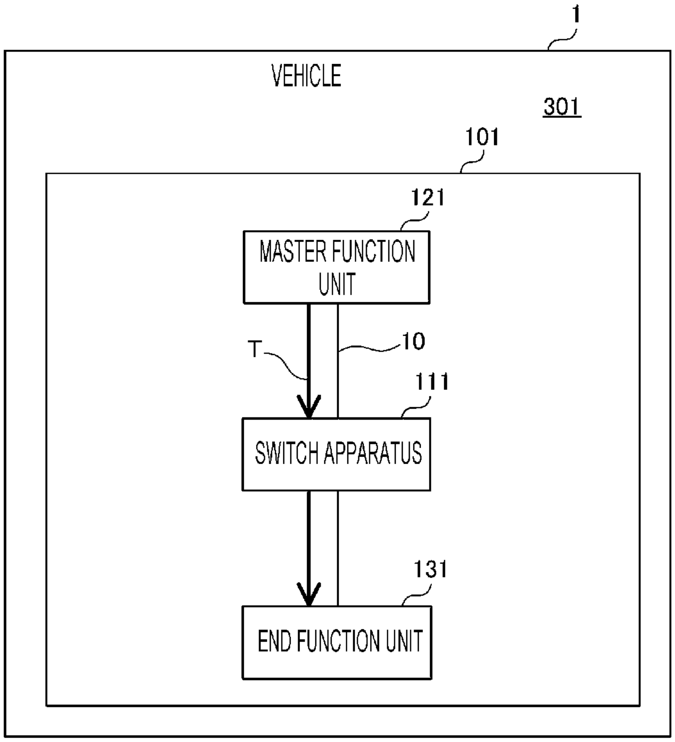
FIG. 1 depicts the configuration of a vehicle-mounted communication system according to an embodiment of the present disclosure.

In the past, a technology was developed where the current time of a certain vehicle-mounted apparatus in a vehicle-mounted communication system is set as a reference time and other vehicle-mounted apparatuses on such a vehicle-mounted communication system perform time synchronization using the reference time.

Problems to be Solved by the Present Disclosure

With the technique described in Patent Document 1, if the reference time transmitted by the grandmaster fluctuates, a problem may occur where operation is not performed properly in the other vehicle-mounted apparatus that performs time synchronization using the reference time.

The present disclosure was conceived to solve the problem described above, and has an object of providing a vehicle-mounted apparatus, a time synchronization method, and a time synchronization program capable of suppressing the occurrence of operation abnormalities in a vehicle-mounted communication system.

Effects of the Present Disclosure

According to the present disclosure, it is possible to suppress the occurrence of operation abnormalities in a vehicle-mounted communication system.

DESCRIPTION OF EMBODIMENTS OF THE PRESENT DISCLOSURE

Several embodiments of the present disclosure will first be listed and described in outline.

(1) A vehicle-mounted apparatus according to an embodiment of the present disclosure includes: a transmission processing unit configured to perform a transmission process for transmitting, to another vehicle-mounted apparatus, first time synchronization information and second time synchronization information including a transmission time at which the first time synchronization information is transmitted, at a predetermined transmission cycle; and a correction unit configured to perform a correction process for correcting the transmission time to be included in the second time synchronization information in a current transmission process, based on a time difference between a current time at the vehicle-mounted apparatus and a previous transmission time, the previous transmission time being the transmission time in the previous transmission process, to a corrected transmission time obtained by adding, to the previous transmission time, the transmission cycle and a value obtained by splitting the time difference.

In this manner, the transmission time to be included in the second time synchronization information in the current transmission process is corrected in consideration of the time difference between the current time and the previous transmission time of the vehicle-mounted apparatus. Thus, even if a fluctuation occurs in the current time of the vehicle-mounted apparatus, the other apparatus can perform time synchronization using the corrected transmission time, thereby suppressing a time discrepancy in the other apparatus. Therefore, it is possible to suppress the occurrence of operation abnormalities in the vehicle-mounted communication system.

(2) In (1) above, the correction unit may perform the correction process when an absolute value of the time difference is a predetermined threshold or more.

With this configuration, it is possible to determine whether or not to perform the correction process for correcting the transmission time to be included in the second time synchronization information even when the time difference is either positive or negative.

(3) In (2) above, the vehicle-mounted apparatus may further include an acquisition unit configured to acquire a data storage cycle at which data is stored in the other vehicle-mounted apparatus, in which the threshold may be determined based on the data storage cycle acquired by the acquisition unit and the transmission cycle.

With this configuration, it is possible to determine whether or not the time difference between the current time and the previous transmission time of the vehicle-mounted apparatus causes an abnormality in the data storage process in the other apparatus, and the other apparatus can store data at a predetermined data storage cycle.

(4) In (3) above, the vehicle-mounted apparatus may further include a transmission cycle setting unit configured to change the transmission cycle to an adjusted cycle shorter than the data storage cycle when the data storage cycle is shorter than the transmission cycle, in which the transmission processing unit may perform the transmission process at the adjusted cycle until the corrected transmission time reaches the current time.

In this manner, the transmission cycle is adjusted when the data storage cycle of the other apparatus is shorter than the transmission cycle. Thus, even if a fluctuation occurs in the current time of the vehicle-mounted apparatus, the other apparatus can perform time synchronization using the corrected transmission time, thereby suppressing a time discrepancy in the other apparatus.

(5) A time synchronization method according to an embodiment of the present disclosure is a time synchronization method for a vehicle-mounted apparatus, the method including: a step of performing a transmission process for transmitting, to another vehicle-mounted apparatus, first time synchronization information and second time synchronization information including a transmission time at which the first time synchronization information is transmitted, at a predetermined transmission cycle; and a step of performing a correction process for correcting the transmission time to be included in the second time synchronization information in a current transmission process, based on a time difference between a current time at the vehicle-mounted apparatus and a previous transmission time, the previous transmission time being the transmission time in the previous transmission process, to a corrected transmission time obtained by adding, to the previous transmission time, the transmission cycle and a value obtained by splitting the time difference.

In this manner, the transmission time to be included in the second time synchronization information in the current transmission process is corrected in consideration of the time difference between the current time and the previous transmission time of the vehicle-mounted apparatus. Thus, even if a fluctuation occurs in the current time of the vehicle-mounted apparatus, the other apparatus can perform time synchronization using the corrected transmission time, thereby suppressing a time discrepancy in the other apparatus. Therefore, it is possible to suppress the occurrence of operation abnormalities in the vehicle-mounted communication system.

(6) A time synchronization program according to an embodiment of the present disclosure is a time synchronization program for use in a vehicle-mounted apparatus, the program causing a computer to function as a transmission processing unit configured to perform a transmission process for transmitting, to another vehicle-mounted apparatus, first time synchronization information and second time synchronization information including a transmission time at which the first time synchronization information is transmitted, at a predetermined transmission cycle; and a correction unit configured to perform a correction process for correcting the transmission time to be included in the second time synchronization information in a current transmission process, based on a time difference between a current time at the vehicle-mounted apparatus and a previous transmission time, the previous transmission time being the transmission time in the previous transmission process, to a corrected transmission time obtained by adding, to the previous transmission time, the transmission cycle and a value obtained by splitting the time difference.

In this manner, the transmission time to be included in the second time synchronization information in the current transmission process is corrected in consideration of the time difference between the current time and the previous transmission time of the vehicle-mounted apparatus. Thus, even if a fluctuation occurs in the current time of the vehicle-mounted apparatus, the other apparatus can perform time synchronization using the corrected transmission time, thereby suppressing a time discrepancy in the other apparatus. Therefore, it is possible to suppress the occurrence of operation abnormalities in the vehicle-mounted communication system.

Preferred embodiments of the present disclosure will now be described with reference to the drawings. Note that identical and corresponding parts in the drawings have been assigned the same reference numerals, and description thereof will not be repeated. The embodiments described below may also be freely combined, at least in part.

[Vehicle-Mounted Communication System]

FIG. 1 depicts the configuration of a vehicle-mounted communication system according to an embodiment of the present disclosure.

As depicted in FIG. 1, a vehicle-mounted communication system 301 includes a switch apparatus 111, a master function unit 121, and an end function unit 131.

The vehicle-mounted communication system 301 is mounted in a vehicle 1. The switch apparatus 111, the master function unit 121, and the end function unit 131 are examples of "vehicle-mounted apparatuses", and are ECUs (Electronic Control Units), for example. The switch apparatus 111, the master function unit 121, and the end function unit 131 construct a vehicle-mounted network 101.

The switch apparatus 111 is connected to a plurality of vehicle-mounted apparatuses via an Ethernet (registered trademark) cable 10, for example, and is capable of communicating with the plurality of vehicle-mounted apparatuses connected to that switch apparatus 111.

In more detail, the switch apparatus 111 performs a relaying process to relay information from a certain vehicle-mounted apparatus to another vehicle-mounted apparatus. As one example, the switch apparatus 111 receives information for time synchronization (hereinafter also referred to as the "time synchronization information T") that has been transmitted from the master function unit 121 and transmits the received time synchronization information T to an end function unit 131.

Information may be exchanged between the switch apparatus 111 and the master function unit 121, and between the switch apparatus 111 and the end function unit 131 using Ethernet frames (hereinafter simply referred to as "frames") that store IP (Internet Protocol) packets, for example.

As examples, the master function unit 121 and the end function units 131 may be an external communication ECU, a sensor, a vehicle-mounted camera, an autonomous driving processing ECU, an engine control device, an AT (Automatic Transmission) control device, an HEV (Hybrid Electric Vehicle) control device, a brake control device, a chassis control device, a steering control device, or an instrument display control device.

The master function unit 121 acquires a reference time t0 for the vehicle-mounted network 101. Here, as one example, the reference time t0 is a time generated by the master function unit 121 using a VCXO (Voltage Controlled Xtal Oscillator), a counter, and the like, not illustrated. The master function unit 121 functions as a GM (Grand Master).

The master function unit 121, for example, generates a reference time t0 that has been synchronized with a time of a time notification apparatus, based on the time indicated by the time notification apparatus such as a navigation device.

In more detail, the time notification apparatus transmits time information, which indicates the time of the time notification apparatus, to the master function unit 121. When the master function unit 121 receives time information from the time notification apparatus, the master function unit 121 updates the value of the counter described above based on the time information. The master function unit 121 sets the time based on the updated value of the counter as the current time at the master function unit 121, i.e., the reference time t0.

The master function unit 121 regularly transmits the time synchronization information T to other vehicle-mounted apparatuses, for example. Here, as examples, the time synchronization information T is a Sync message and a follow-up message, which will be described later.

The switch apparatus 111 performs time synchronization with the master function unit 121 based on the time synchronization information T. In more detail, the switch apparatus 111 calculates the time difference with the master function unit 121 using the time synchronization information T transmitted by the master function unit 121. The switch apparatus 111 corrects its own time using the calculated time difference.

The end function unit 131 performs time synchronization with the switch apparatus 111 based on the time synchronization information T. In more detail, the end function unit 131 calculates the time difference with the switch apparatus 111 using the time synchronization information T transmitted by the switch apparatus 111. The end function unit 131 corrects its own time using the calculated time difference.

[Switch Apparatus]

Figure 2:
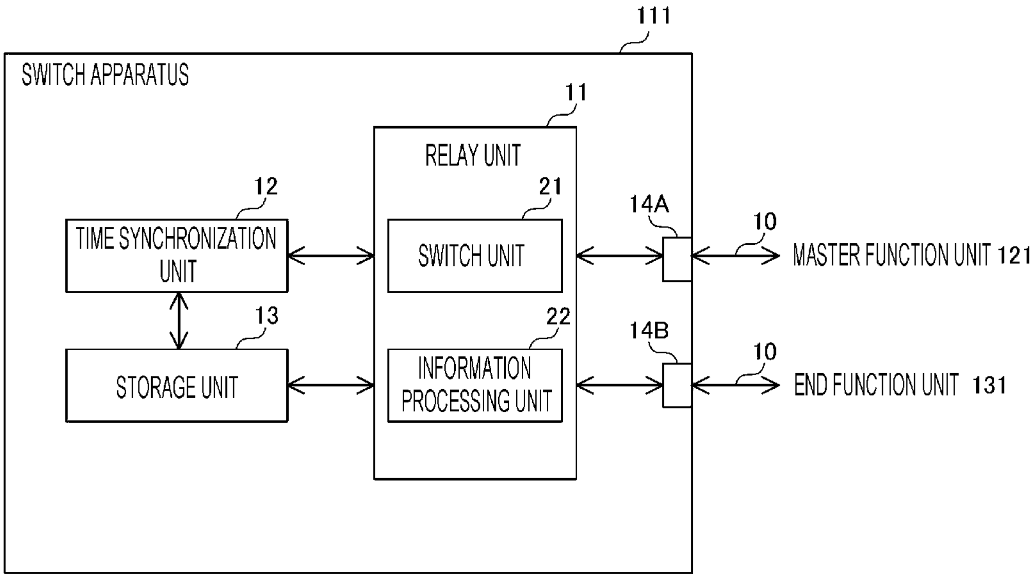
FIG. 2 depicts the configuration of a switch apparatus according to an embodiment of the present disclosure.

FIG. 2 depicts the configuration of a switch apparatus according to the embodiment of the present disclosure.

As depicted in FIG. 2, the switch apparatus 111 includes a relay unit 11, a time synchronization unit 12, a storage unit 13, and a plurality of communication ports 14.

As one example, one or both of the relay unit 11 and the time synchronization unit 12 are realized by a processing circuit (or "circuitry") including one or a plurality of processors. As one example, the storage unit 13 is a non-volatile memory included in such a processing circuit. The relay unit 11 includes a switch unit 21 and an information processing unit 22.

(Relay Processing by Switch Apparatus)

Each communication port 14 is a terminal to which an Ethernet cable 10 can be connected, for example. These communication ports 14 may be terminals of an integrated circuit. Each of the plurality of communication ports 14 is connected via an Ethernet cable 10 to one out of the plurality of vehicle-mounted apparatuses on the vehicle-mounted network 101. In this example, a communication port 14A is connected to the master function unit 121, and a communication port 14B is connected to an end function unit 131.

The storage unit 13 stores an address table indicating the correspondence between port numbers of the communication ports 14 and the MAC (Media Access Control)

addresses of other vehicle-mounted apparatuses connected to the communication ports 14.

The relay unit 11 relays data to and from other vehicle-mounted apparatuses by communicating with such other vehicle-mounted apparatuses. That is, when the relay unit 11 receives an Ethernet frame transmitted from the master function unit 121 or an end function unit 131 via the corresponding communication port 14, the relay unit 11 performs relay processing for the received Ethernet frame.

In more detail, the switch unit 21 in the relay unit 11 refers to the address table stored in the storage unit 13 and specifies a port number corresponding to a destination MAC address included in the received Ethernet frame. The switch unit 21 then transmits the received Ethernet frame from the communication port 14 with the specified port number.

[Master Function Unit]

Figure 3:
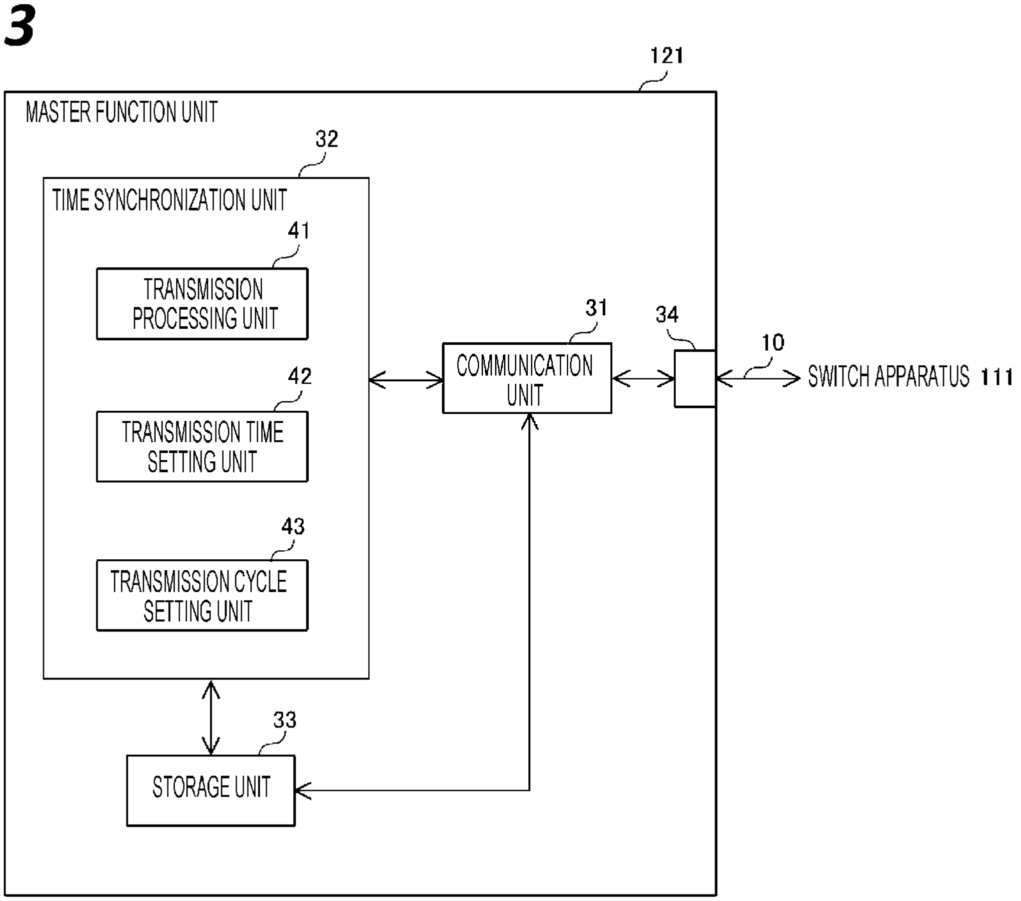
FIG. 3 depicts the configuration of a master function unit according to an embodiment of the present disclosure.

FIG. 3 depicts the configuration of a master function unit according to the embodiment of the present disclosure.

As depicted in FIG. 3, the master function unit 121 includes a communication unit 31, a time synchronization unit 32, a storage unit 33, and a communication port 34.

One or both of the communication unit 31 and the time synchronization unit 32 are realized by a processing circuit including one or a plurality of processors, for example. As one example, the storage unit 33 is a non-volatile memory included in such a processing circuit. The communication port 34 is a terminal to which an Ethernet cable 10 can be connected, for example. Note that the communication port 34 may be a terminal of an integrated circuit or the like. The communication port 34 is connected via the Ethernet cable 10 to the switch apparatus 111. The time synchronization unit 32 includes a transmission processing unit 41, a transmission time setting unit 42, and a transmission cycle setting unit 43.

Figure 4:
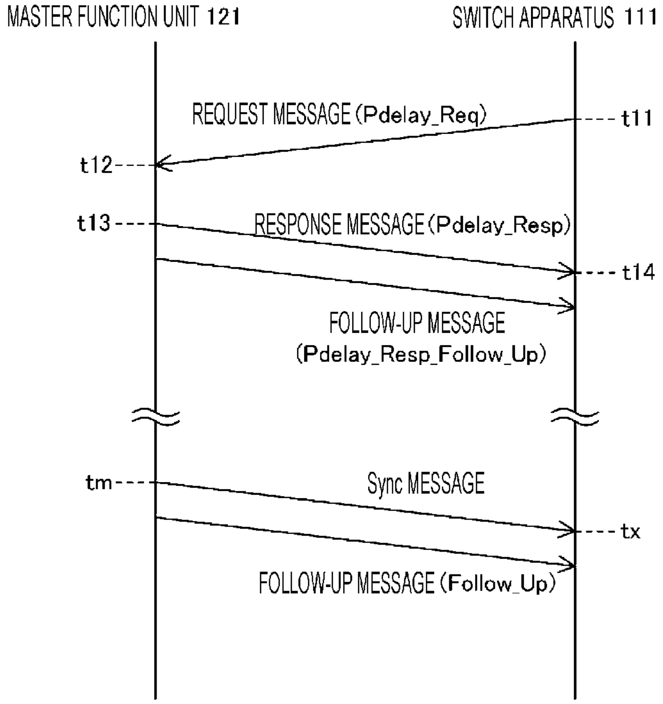
FIG. 4 is a diagram useful in explaining a method of updating a propagation delay time by the switch apparatus according to an embodiment of the present disclosure.

FIG. 4 is a diagram useful in explaining a method of updating a propagation delay time by a switch apparatus according to an embodiment of the present disclosure.

As depicted in FIGS. 2, 3, and 4, the switch apparatus 111 updates a propagation delay time Td1 for data between the master function unit 121 and the switch apparatus 111 by transmitting and receiving time synchronization information T to/from the master function unit 121 in accordance with the IEEE (registered trademark) 802.1 Standard, for example. In more detail, the time synchronization unit 12 transmits a request message (Pdelay_Req), which requests time information to be used to update the propagation delay time Td1, to the master function unit 121 via the relay unit 11 and the communication port 14A.

The communication unit 31 of the master function unit 121 receives the request message transmitted from the switch apparatus 111 via the communication port 34, and outputs the received request message to the time synchronization unit 32.

The transmission processing unit 41 in the time synchronization unit 32 receives the request message from the communication unit 31 and outputs a response message (Pdelay_Resp), which is an example of the time synchronization information T, to the communication unit 31 in response to the request message. The communication unit 31 transmits the response message received from the time synchronization unit 32 to the switch apparatus 111 via the communication port 34. When this is performed, the time synchronization unit 32 transmits the response message including a reception time t12 of the request message.

Also, after transmitting the response message, the transmission processing unit 41 outputs a follow-up message (Pdelay_Resp_Follow_Up), which includes the transmission time t13 of the response message, to the communication unit 31. The communication unit 31 transmits the follow-up message received from the transmission processing unit 41 to the switch apparatus 111 via the communication port 34.

The information processing unit 22 in the switch apparatus 111 receives, via the communication port 14A, the response message and the follow-up message transmitted from the master function unit 121. The information processing unit 22 then notifies the time synchronization unit 12 of the time t12 included in the response message and the time t13 included in the follow-up message.

Also, the information processing unit 22 notifies the time synchronization unit 12 of the transmission time t11 of the request message and the reception time t14 of the response message. In more detail, the switch apparatus 111 includes a counter (not shown). The information processing unit 22 notifies the time synchronization unit 12 of the count value of the counter at the transmission timing of the request message as the transmission time t11. The information processing unit 22 also notifies the time synchronization unit 12 of the count value of the counter at the reception timing of the response message as the reception time t14.

The time synchronization unit 12 calculates the propagation delay time Td1 for data between the master function unit 121 and the switch apparatus 111 based on the times t11, t12, t13, and t14 indicated by the information processing unit 22. In more detail, the time synchronization unit 12 calculates the propagation delay time $Td1=((t14-t11)-(t13-t12))/2$. The time synchronization unit 12 then updates the propagation delay time Td1 stored in the storage unit 13 to the newly calculated propagation delay time Td1.

(Time Correction at Switch Apparatus)

The transmission processing unit 41 in the master function unit 121 performs a transmission process S for transmitting, to another apparatus, a Sync message, which is one example of the first time synchronization information, and the follow-up message, which is one example of the second time synchronization information, at a predetermined transmission cycle P. Note that the terms “first” and “second” do not imply a priority order.

More specifically, the transmission processing unit 41 transmits a frame in which the Sync message is stored to the switch apparatus 111 via the communication unit 31 and the communication port 34. The communication unit 31 stores, in the storage unit 33, a transmission time tm of the Sync message as a time stamp.

The transmission processing unit 41 transmits the frame in which the Sync message is stored and then transmits the frame in which the follow-up message is stored, to the switch apparatus 111 via the communication unit 31 and the communication port 34. The follow-up message includes the transmission time tm of the Sync message. Here, it is presumed that the transmission processing unit 41 performs a transmission process S at a transmission cycle P of 125 milliseconds. The transmission cycle P is stored in the storage unit 33.

The time synchronization unit 12 of the switch apparatus 111 receives a frame in which the Sync message is stored and a frame in which the follow-up message is stored that have been transmitted from the master function unit 121 via the communication port 14A and the relay unit 11. The time synchronization unit 12 then stores the Sync message stored in the received frame in the storage unit 13, for example.

The information processing unit 22 in the switch apparatus 111 also checks the transmission source of the received frames, for example, by referring to the domain IDs included in the message headers of the frames.

In addition, when the information processing unit 22 has confirmed that the frame in which the Sync message is stored was received from the master function unit 121, the information processing unit 22 notifies the time synchronization unit 12 of the count value of the counter at the reception timing of that frame as the reception time tx of the Sync message.

The time synchronization unit 12 performs time synchronization with the master function unit 121 based on the transmission time tm and the reception time tx indicated from the information processing unit 22 and the propagation delay time Td1 stored in the storage unit 13. In more detail, based on the transmission time tm, the reception time tx, and the propagation delay time Td1, the time synchronization unit 12 calculates the time difference Tx1=tm−Td1−tx between the time at the master function unit 121 and the time at the switch apparatus 111.

The time synchronization unit 12 then corrects the time at the switch apparatus 111 using the calculated time difference Tx1. More specifically, the time synchronization unit 12 acquires, as the current time at the switch apparatus 111, the time obtained by adding the time difference Tx1 to the transmission time tm. As a result of this, time synchronization is established between the master function unit 121 that is the GM and the switch apparatus 111.

[End Function Unit]

(Configuration of End Function Unit)

Figure 5:
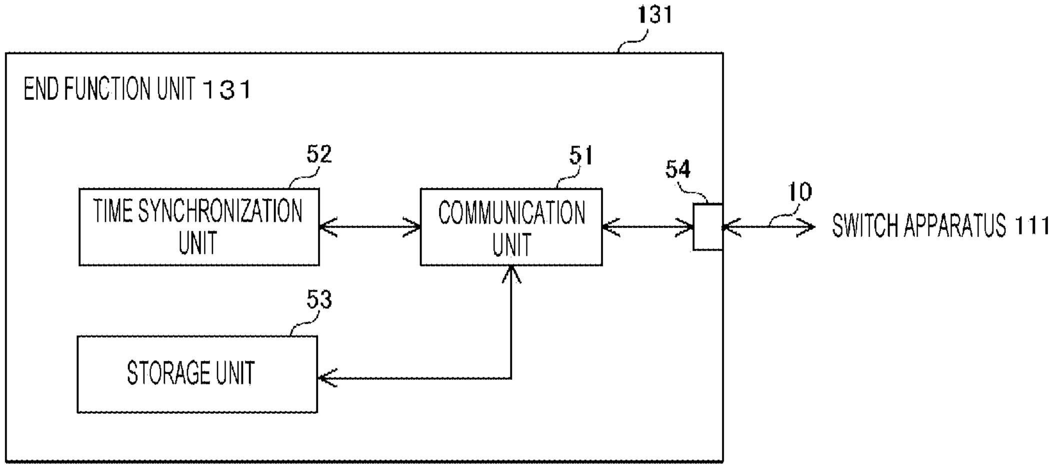
FIG. 5 depicts the configuration of an end function unit according to an embodiment of the present disclosure.

FIG. 5 depicts the configuration of an end function unit according to an embodiment of the present disclosure.

As depicted in FIG. 5, the end function unit 131 includes a communication unit 51, a time synchronization unit 52, a storage unit 53, and a communication port 54. One or both of the communication unit 51 and the time synchronization unit 52 are realized by a processing circuit including one or a plurality of processors for example. The storage unit 53 is a non-volatile memory included in such a processing circuit, for example. The communication port 54 is a terminal to which an Ethernet cable 10 can be connected, for example. Note that the communication port 54 may be a terminal of an integrated circuit or the like. The communication port 54 is connected via the Ethernet cable 10 to the switch apparatus 111.

(Updating of Propagation Delay Time for Data Between Switch Apparatus and End Function Unit)

The end function unit 131 updates a propagation delay time Td2 for data between the switch apparatus 111 and the end function unit 131.

Figure 6:
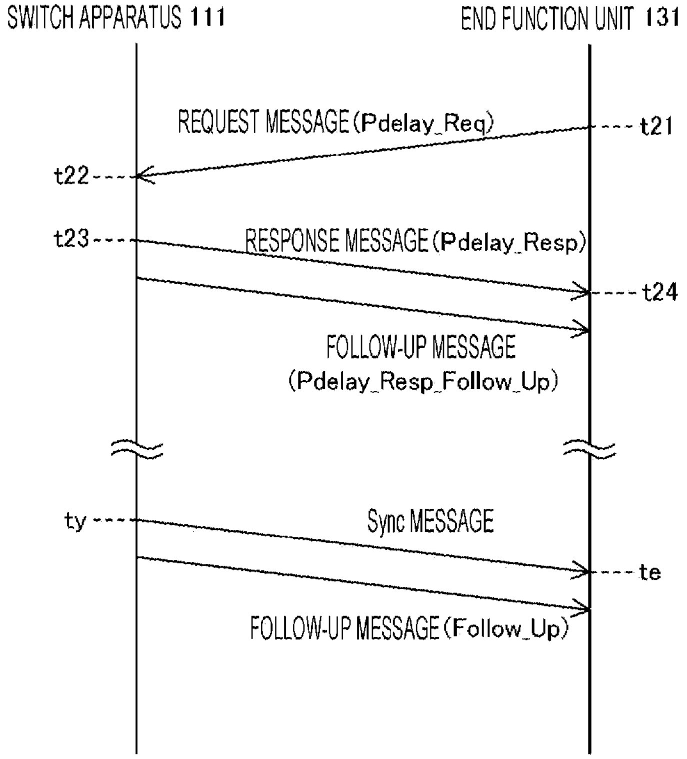
FIG. 6 is a diagram useful in explaining a method of updating the propagation delay time by the end function unit according to an embodiment of the present disclosure.

FIG. 6 is a diagram useful in explaining a method of updating the propagation delay time by the end function unit according to an embodiment of the present disclosure.

By referring to FIGS. 5 and 6, the time synchronization unit 52 of the end function unit 131 updates the propagation delay time Td2 for data between the switch apparatus 111 and the end function unit 131 regularly or irregularly in the same way as the time synchronization unit 12 of the switch apparatus 111 depicted in FIG. 2. In more detail, the time synchronization unit 52 transmits a request message for requesting time information to be used to update the propagation delay time Td2 via the communication unit 51 and the communication port 54 to the switch apparatus 111.

When the information processing unit 22 of the switch apparatus 111 has received this request message transmitted from the end function unit 131 via the communication port 14B, the information processing unit 22 outputs the request message to the time synchronization unit 12.

When the time synchronization unit 12 has received the request message from the information processing unit 22, the time synchronization unit 12 transmits a response message to this request message via the relay unit 11 and the communication port 14B to the end function unit 131. When this is performed, the time synchronization unit 12 transmits the response message including a reception time t22 of the request message.

After transmitting the response message, the time synchronization unit 12 transmits a follow-up message including the transmission time t23 of this response message via the relay unit 11 and the communication port 14B to the end function unit 131.

The communication unit 51 of the end function unit 131 receives the response message and the follow-up message transmitted from the switch apparatus 111 via the communication port 54. The communication unit 51 then notifies the time synchronization unit 52 of the time t22 included in the response message and the time t23 included in the follow-up message.

The communication unit 51 also notifies the time synchronization unit 52 of the transmission time t21 of the request message and the reception time t24 of the response message. In more detail, the end function unit 131 includes a counter (not illustrated). The communication unit 51 notifies the time synchronization unit 52 of the count value of the counter at the transmission timing of the request message as the transmission time t21. The communication unit 51 also notifies the time synchronization unit 52 of the count value of the counter at the timing of reception of the response message as the reception time t24.

The time synchronization unit 52 calculates the propagation delay time Td2 for data between the switch apparatus 111 and the end function unit 131 based on the times t21, t22, t23, and t24 indicated by the communication unit 51. In more detail, the time synchronization unit 52 calculates the propagation delay time Td2=((t24−t21)−(t23−t22))/2. The time synchronization unit 52 then updates the propagation delay time Td2 stored in the storage unit 53 to the newly calculated propagation delay time Td2.

(Time Correction at End Function Unit)

The time synchronization unit 12 at the switch apparatus 111 regularly or irregularly transmits a Sync message to the end function unit 131. After transmitting the Sync message, the time synchronization unit 12 also transmits a follow-up message including the transmission time ty of the Sync message to the end function unit 131.

The end function unit 131 performs time synchronization based on the Sync message and the follow-up message transmitted from the switch apparatus 111. In more detail, the communication unit 51 of the end function unit 131 receives, via the communication port 54, a frame in which the Sync message is stored and a frame in which the follow-up message is stored, the messages being transmitted from the switch apparatus 111. The communication unit 51 then checks the transmission source of the frames by referring for example to the domain ID included in the message header of the frame in which the received Sync message is stored.

When the communication unit 51 has confirmed that the frame in which the Sync message is stored was received from the master function unit 121, the communication unit 51 notifies the time synchronization unit 52 of the transmission time ty included in the follow-up message received immediately after such frame, for example. The communication unit 51 also notifies the time synchronization unit 52 of the count value of the counter at the timing of reception of the Sync message stored in that frame as the reception time the of the Sync message.

The time synchronization unit 52 performs time synchronization with the switch apparatus 111 based on the transmission time ty and the reception time the that are indicated from the communication unit 51 and the propagation delay time Td2 stored in the storage unit 53. In more detail, the time synchronization unit 52 calculates the time difference Tx2=ty−Td2−the, which is the difference between the time at the switch apparatus 111 and the time at the end function unit 131. The time synchronization unit 52 then corrects the time at the end function unit 131 to which it belongs using the calculated time difference Tx2. The time synchronization unit 52 acquires, as the current time at the end function unit 131, the time obtained by adding the time difference Tx2 to the transmission time ty.

Here, when time synchronization has been established between the master function unit 121 and the switch apparatus 111, the transmission time ty included in the follow-up message transmitted from the switch apparatus 111 to the end function unit 131 will be time that has been synchronized with the master function unit 121. This means that by having the time synchronization unit 52 of the end function unit 131 perform time correction, time synchronization is established between the end function unit 131 and the switch apparatus 111. As a result of this, time synchronization between the end function unit 131 and the master function unit 121 is established.

Description of Problems

However, in the vehicle-mounted communication system 301, when time synchronization is normally performed between vehicle-mounted apparatuses, the reference time to updated by the master function unit 121 that is the GM may fluctuate for some reason.

For example, if an abnormality occurs in the process in which the master function unit 121 updates the counter value based on the time information received from the above time notification apparatus, the reference time t0 may fluctuate, i.e., shift. Also, the vehicle-mounted communication system 301 includes a plurality of master function units 121 in some cases. Specifically, the vehicle-mounted communication system 301 may include another master function unit 121, which performs time synchronization with the master function unit 121 such that another master function unit 121 functions as a backup system in case of failure of a given master function unit 121. In this case, if an abnormality occurs in time synchronization between the plurality of master function units 121, the reference time t0 may fluctuate.

If the reference time t0 has fluctuated, the switch apparatus 111 and the end function unit 131 may not operate normally. For example, the consistency of the data storage time in the switch apparatus 111 and the end function unit 131 may be lost when the reference time t0 has fluctuated.

Figure 7:
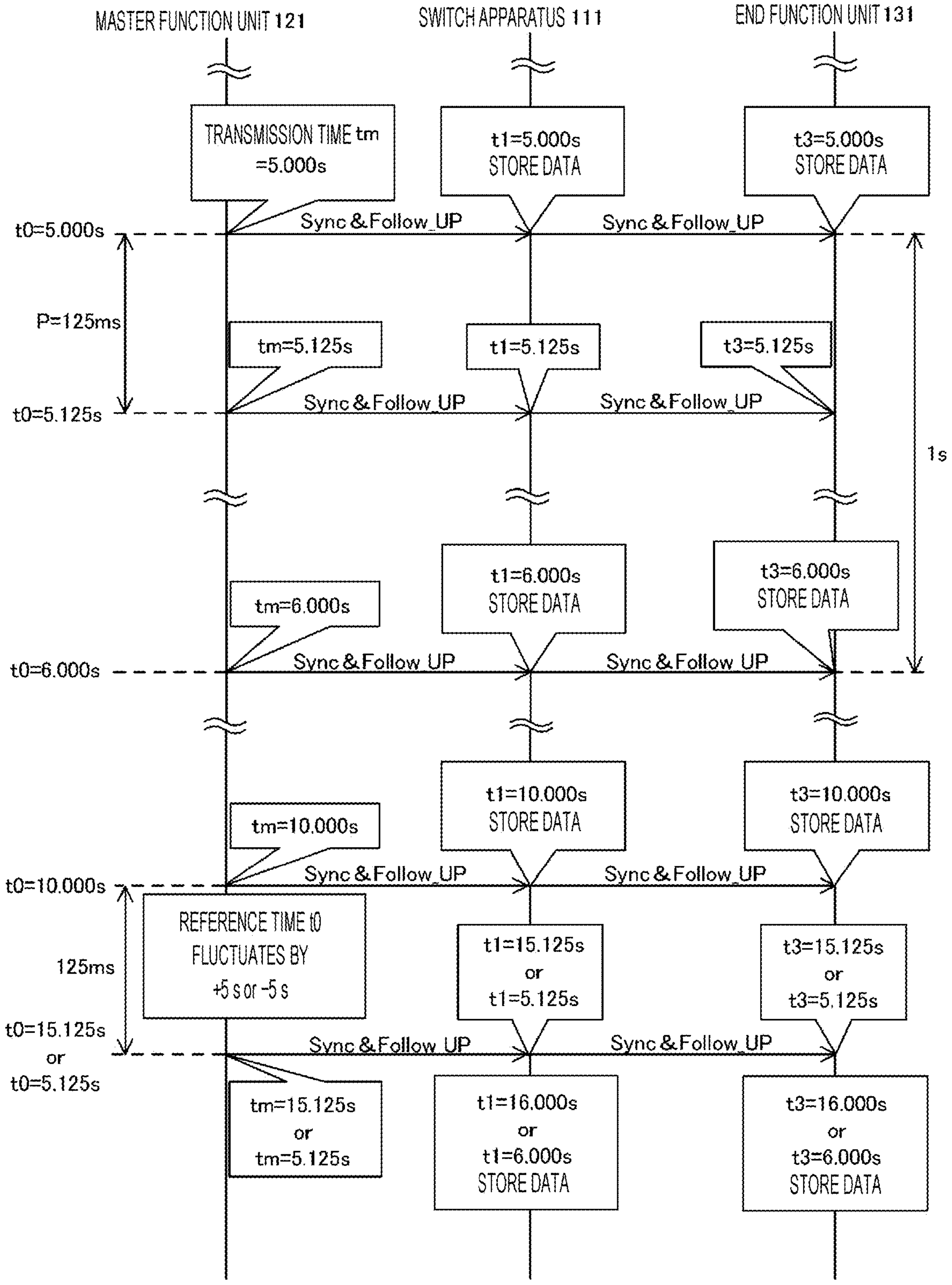
FIG. 7 is a diagram useful in explaining a discrepancy in the data storage time in the switch apparatus and the end function unit when the reference time fluctuates in a vehicle-mounted communication system according to a comparative example.

FIG. 7 is a diagram useful in explaining a discrepancy in the data storage time in the switch apparatus and the end function unit when the reference time has fluctuated in a vehicle-mounted communication system according to a comparative example.

In FIGS. 7, and 8 to 10, which will be mentioned later, "t1" is the time at the switch apparatus 111, and "t3" is the time at the end function unit 131. Also, in FIGS. 7, and 8 to 10, which will be mentioned later, "Sync" represents a Sync message, "Follow_UP" represents a follow-up message, and "Sync&Follow_UP" indicates that a Sync message is transmitted and a follow-up message is then transmitted. Also, in the following description and FIGS. 7, and 8 to 10, which will be mentioned later, "seconds" may be expressed as "s", and "milliseconds" may be expressed as "ms".

In the example depicted in FIG. 7, the cycle at which the switch apparatus 111 and the end function unit 131 stores data (hereinafter, also referred to as "data storage cycle C") is 1 second. The data storage cycle C is, for example, a log data storage cycle.

Referring to FIG. 7, the switch apparatus 111 and the end function unit 131 store data every second during a period from 5.000 seconds to 10.000 seconds. Here, it is presumed that the switch apparatus 111 and the end function unit 131 each store data at "t1=10.000 s" and "t3=10.000 s", and then the reference time t0 of the master function unit 121 fluctuates by +5 seconds or −5 seconds.

Immediately after the reference time t0 has fluctuated by +5 seconds, the reference time t0 when the master function unit 121 performs the transmission process S is "15.125 s". Immediately after the reference time t0 has fluctuated by −5 seconds, the reference time t0 when the master function unit 121 performs the transmission process S is "5.125 s". Thus, in the example depicted in FIG. 7, the transmission time tm included in the follow-up message in the transmission process S performed immediately after the reference time t0 has fluctuated is "15.125 s" or "5.125 s".

When the switch apparatus 111 performs time synchronization based on the follow-up message transmitted from the master function unit 121 and including the transmission time tm of "15.125 s" or "5.125 s", the time t1 at the switch apparatus 111 is "15.125 s" or "5.125 s". Since the switch apparatus 111 transmits the follow-up message to the end function unit 131, the time t3 at the end function unit 131 is also "15.125 s" or "5.125 s". In this case, the next data storage time at the switch apparatus 111 and the end function unit 131 may be "16.000 s" or "6.000 s".

If the data storage time has changed to "16.000 s" due to the reference time t0 having fluctuated by +5 seconds, data will not be stored during a period from time t1 of 11.000 seconds to a time t3 of 15.000 seconds. That is, in each of the switch apparatus 111 and the end function unit 131, the interval from the previous data storage time "10.000 s" to the current data storage time "16.000 s" is 6 seconds, and the data storage cycle C is shifted from 1 second. This results in irregular data storage times.

If the data storage time has changed to "6.000 s" due to the reference time t0 having fluctuated by −5 seconds, data storage times from 6.0000 seconds to 10.000 seconds will overlap in both the switch apparatus 111 and the end function unit 131, and, for example, multiple pieces of data at the same time will be stored.

If the consistency of the data storage time in the switch apparatus 111 and the end function unit 131 is lost due to a fluctuation in the reference time t0 in this manner, normal operation may not be performed in the vehicle-mounted communication system 301.

In view of this, the master function unit 121 according to an embodiment of the present disclosure solves the problems described above through use of the configuration and operations described below.

[Correction of Transmission Time]

Referring to FIG. 3 again, the communication unit 31 of the master function unit 121 is one example of an acquisition unit, and acquires the data storage cycle C in the other switch apparatus 111 and the end function unit 131. In more detail, the communication unit 31 acquires the data storage cycle C stored in the storage unit 33 in advance, and outputs cycle information indicating the data storage cycle C to the time synchronization unit 32.

The transmission time setting unit 42 of the time synchronization unit 32 is one example of a correction unit, and monitors a time difference Ta=t0−tm1 between the reference time t0, which indicates the current time at the switch apparatus, and the transmission time tm included in the follow-up message in the previous transmission process S. The transmission time setting unit 42 in the time synchronization unit 32 performs a correction process for correcting the transmission time tm to be included in the follow-up message in the transmission process S based on the time difference Ta.

More specifically, before the transmission process S is performed, the transmission time setting unit 42 refers to the previous transmission time tm1 at the storage unit 33, and calculates the time difference Ta using the previous transmission time tm1 and the reference time t0. The transmission time setting unit 42 performs the above correction process when the absolute value of the time difference Ta is a predetermined threshold Th or more. The transmission time setting unit 42 adds the corrected transmission time tm to the follow-up message to be transmitted by the transmission processing unit 41.

The threshold Th is determined based on the data storage cycle C and the transmission cycle P acquired by the communication unit 31. For example, the transmission time setting unit 42 uses different thresholds Th when the time difference Ta is positive and when the time difference Ta is negative.

In more detail, the transmission time setting unit 42 performs the above correction process when the time difference Ta is the data storage cycle C or more, for example, 1 second or more. The transmission time setting unit 42 also performs the above correction process when the time difference Ta is (−1×transmission cycle P) or less, for example, −125 milliseconds or less.

Figure 8:
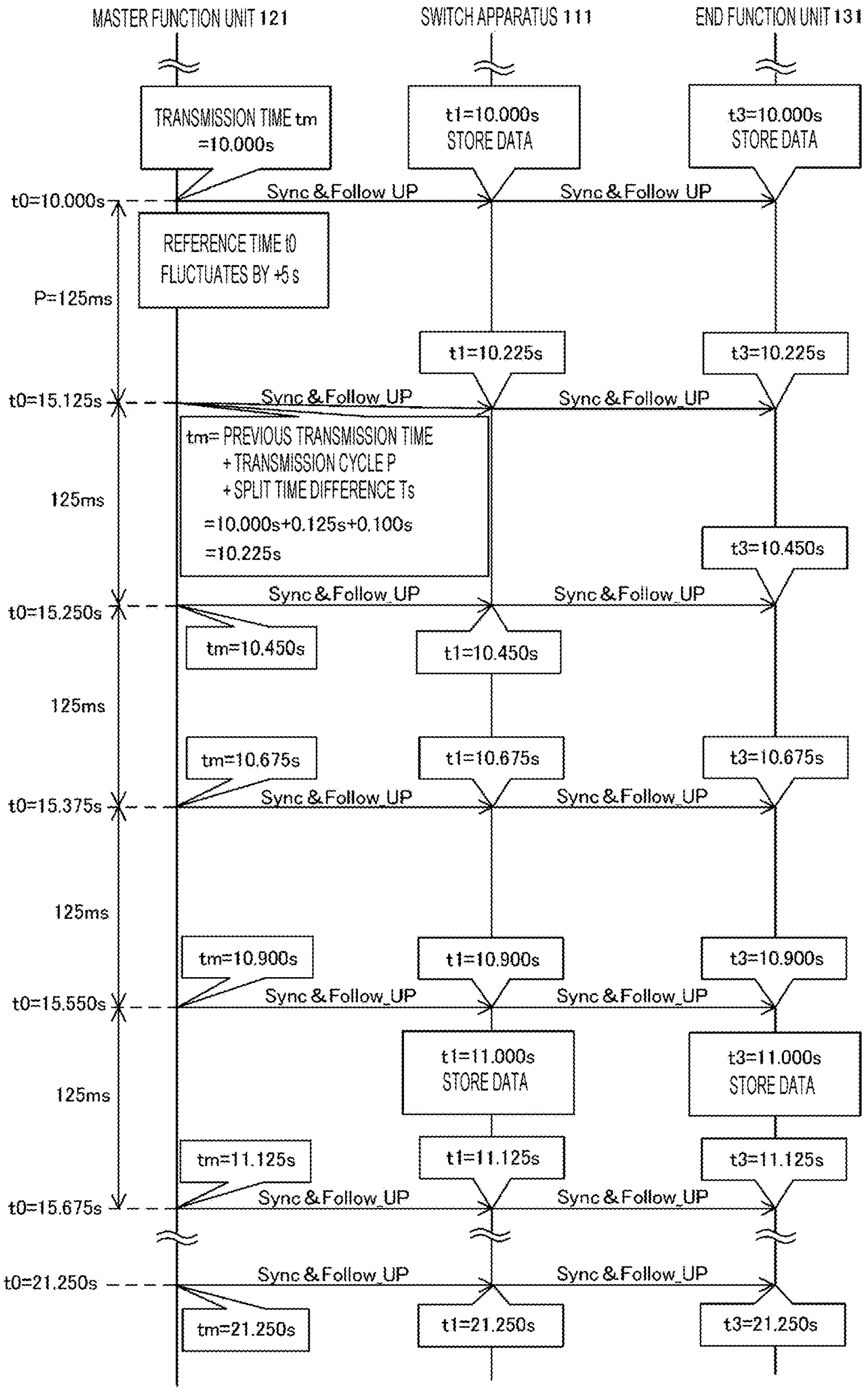
FIG. 8 is a diagram useful in explaining an example of a method of correcting the transmission time of a Sync message by the master function unit according to an embodiment of the present disclosure.

FIG. 8 is a diagram useful in explaining an example of a method of correcting the transmission time of a Sync message by the master function unit according to the embodiment of the present disclosure.

In the example depicted in FIG. 8, similarly to FIG. 7, the data storage cycle C is 1 second, and the transmission cycle P is 125 milliseconds. FIG. 8 shows a case where the reference time t0 fluctuates by +5 seconds immediately after the switch apparatus 111 and the end function unit 131 each store data at "time t1=10.000 s" and "time t3=10.000 s". That is, the time difference Ta is +5 seconds in FIG. 8. Also, the next data storage time is "11.000 s" in FIG. 8.

Referring to FIGS. 2 and 8, when the time difference Ta is the data storage cycle C or more, the transmission time setting unit 42 acquires a split time difference Ts, which is a value obtained by splitting the time difference Ta. In the example depicted in FIG. 8, the time difference Ta is +5 seconds and the data storage cycle C is 1 second, and thus the time difference Ta is the data storage cycle C or more.

The table D that indicates the correspondence between the data storage cycle C and the split time difference Ts is stored in the storage unit 33 in advance, for example. The transmission time setting unit 42 refers to the table D and acquires the split time difference Ts corresponding to the data storage cycle C included in the cycle information received from the communication unit 31. The split time difference Ts is set to a value that is less than the transmission cycle P. Here, it is presumed that the split time difference Ts is 100 milliseconds. Note that the configuration of the transmission time setting unit 42 is not limited to the configuration in which the transmission time setting unit 42 refers to the table D stored in the storage unit 33 and acquires the split time difference Ts, and the split time difference Ts may be calculated using the data storage cycle C and the transmission cycle P in accordance with a predetermined arithmetic formula.

The transmission time setting unit 42 corrects the transmission time tm to be included in the follow-up message in the current transmission process S to the corrected transmission time tm2, which is the time obtained by adding the transmission cycle P and the split time difference Ts to the previous transmission time tm1. That is, the corrected transmission time tm2 is expressed by the following formula (1).

$$tm2 = tm1 + P + Ts \quad (1)$$

In the transmission process S performed immediately after the reference time t0 fluctuates by +5 seconds, i.e., when the reference time t0 is "15.125 s", the corrected transmission time tm2 is "10.225 s", which is the time obtained by adding "125 ms", which is the transmission cycle P, and "100 ms", which is the split time difference Ts, to "10.000 s", which is the previous transmission time tm1. The transmission time setting unit 42 sets the corrected transmission time tm2 as the transmission time tm to be included in the follow-up message in the transmission process S.

The switch apparatus 111 performs time synchronization based on the follow-up message received from the master function unit 121 and including the corrected transmission time tm2. As a result, the time t1 at the switch apparatus 111 changes to "10.225 s". Also, the end function unit 131 performs time synchronization based on the follow-up message received from the switch apparatus 111. As a result, the time t3 at the end function unit 131 changes to "10.225 s".

The transmission time setting unit 42 performs the above correction process until the transmission time tm of the Sync message reaches the reference time t0. Here, the transmission time setting unit 42 corrects the transmission time tm to "10.225 s", and then to "10.450 s", "10.675 s", "10.900 s", and "11.125 s" in the stated order. As a result, the time t1 and the time t3 at the switch apparatus 111 and the end function unit 131, respectively, change to "10.225 s", then to "10.450 s", "10.675 s", "10.900 s", and "11.125 s" in the stated order. Therefore, the switch apparatus 111 and the end function unit 131 can store data at "11.000 s", which is between "10.900 s" and "11.125 s", as the timing next to "10.000 s", which is the previous data storage time.

When the transmission time tm of the Sync message reaches the reference time t0, the transmission time setting unit 42 sets the transmission time tm to be included in the follow-up message as the reference time t0. In the example depicted in FIG. 8, as a result of the 50th correction process, the transmission time tm to be included in the follow-up message in the current transmission process S changes to "21.250 s", which reaches the reference time t0.

FIG. 8 illustrates an example in which, when the time difference Ta is +5 seconds and the data storage cycle Cis 1 second, the split time difference Ts is the value obtained by splitting the time difference Ta by 50, i.e., 100 milliseconds. Note that, when the time difference Ta is +5 seconds and the data storage cycle C is 2 seconds, the split time difference Ts may be the value obtained by splitting the time difference Ta by 25, i.e., 200 ms. The split time difference Ts is not limited to 100 milliseconds, and may be a different value depending on the data storage cycle C in this manner.

Figure 9:
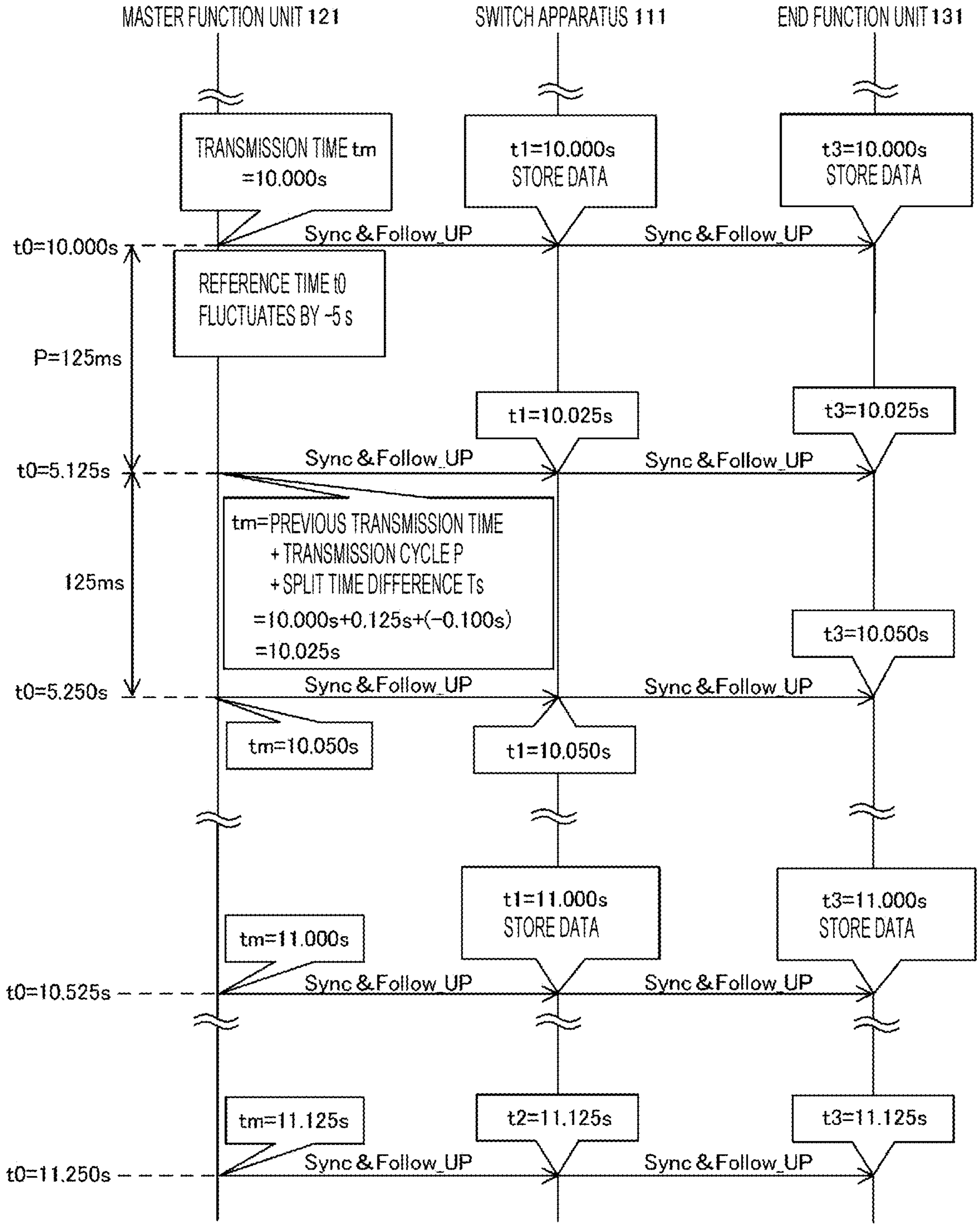
FIG. 9 is a diagram useful in explaining another example of the method of correcting the transmission time of a Sync message by the master function unit according to an embodiment of the present disclosure.

FIG. 9 is a diagram useful in explaining another example of a method of correcting the transmission time of a Sync message by the master function unit according to an embodiment of the present disclosure.

In the example depicted in FIG. 9, similarly to FIGS. 7 and 8, the data storage cycle C is 1 second, and the transmission cycle P is 125 milliseconds. FIG. 9 shows a case where the reference time t0 fluctuates by −5 seconds immediately after the switch apparatus 111 and the end function unit 131 each store data at "time t1=10.000 s" and "time t3=10.000 s". That is, in the example depicted in FIG. 9, since the time difference Ta is −125 milliseconds or less, the transmission time setting unit 42 performs a correction process for correcting the transmission time tm to be included in the follow-up message in the transmission process S.

More specifically, the transmission time setting unit 42 refers to the table D stored in the storage unit 33 and acquires the split time difference Ts corresponding to the data storage cycle C. In the example depicted in FIG. 9, the split time difference Ts is, for example, −100 milliseconds.

The transmission time setting unit 42 then corrects the transmission time tm to be included in the follow-up message in the current transmission process S to a corrected transmission time tm2.

In the transmission process S performed immediately after the reference time t0 fluctuates by −5 seconds, i.e., when the reference time t0 is "5.125 s", the corrected transmission time tm2 is "10.025 s", which is the time obtained by adding "125 ms", which is the transmission cycle P, and "−100 ms", which is the split time difference Ts, to "10.000 s", which is the previous transmission time tm1. The transmission time setting unit 42 sets the corrected transmission time tm2 as the transmission time tm to be included in the follow-up message in the transmission process S.

The switch apparatus 111 performs time synchronization based on the follow-up message received from the master function unit 121 and including the corrected transmission time tm2. As a result, the time t1 at the switch apparatus 111 changes to "10.025 s". Also, the end function unit 131 performs time synchronization based on the follow-up message received from the switch apparatus 111. As a result, the time t3 of the end function unit 131 changes to "10.025 s".

Then, the transmission time setting unit 42 corrects the transmission time tm to "10.050 s", and thus the time t1 at the switch apparatus 111 and the time t3 of the end function unit 131 change to "10.050 s". Through the correction process performed by the transmission time setting unit 42, the time t1 at the switch apparatus 111 and the time t3 at the end function unit 131 change to a time later than "10.000 s", which is the data storage time immediately before the current data storage time. Therefore, even when the reference time t0 fluctuates by −5 seconds, the switch apparatus 111 and the end function unit 131 do not have overlapping data storage times and can store data at "11.000 s", which is the next data storage time.

Figure 10:
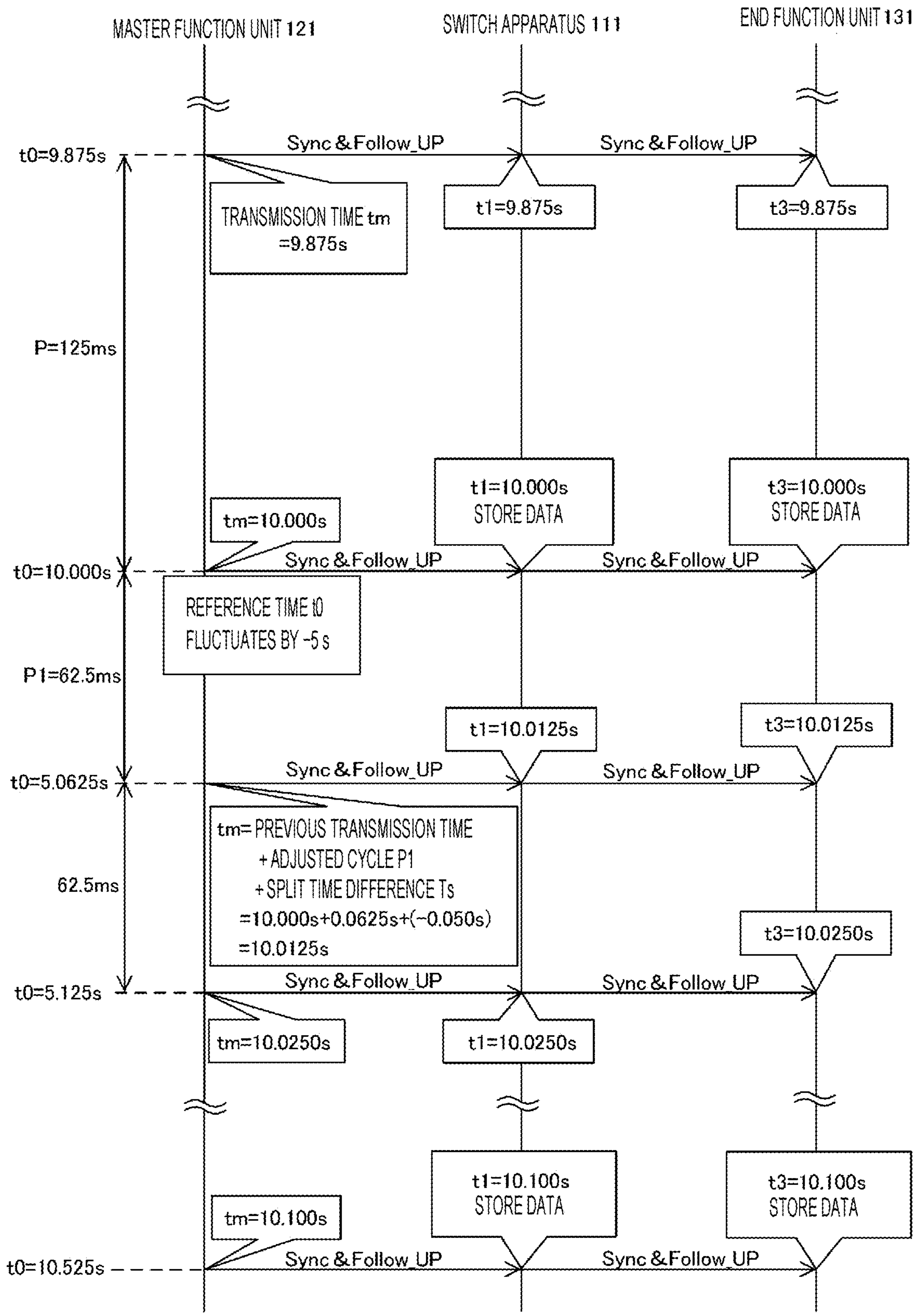
FIG. 10 is a diagram useful in explaining another example of the method of correcting the transmission time of a Sync message by the master function unit according to an embodiment of the present disclosure.

FIG. 10 is a diagram useful in explaining another example of a method of correcting the transmission time of a Sync message by the master function unit according to an embodiment of the present disclosure.

Similar to FIG. 9, FIG. 10 illustrates a case where the reference time t0 fluctuates by −5 seconds immediately after the switch apparatus 111 and the end function unit 131 each store data at "time t1=10.000 s" and "time t3=10.000 s".

In the example depicted in FIG. 10, the data storage cycle C is 100 milliseconds, and the transmission cycle P before the reference time t0 fluctuates is 125 milliseconds. That is, in the example depicted in FIG. 10, the data storage cycle C is shorter than the transmission cycle P. In this case, in the correction process performed by the transmission time setting unit 42, the corrected transmission time obtained by adding the transmission cycle P and the split time difference Ts to the previous transmission time tm1 may exceed the next data storage time.

Referring to FIGS. 2 and 10, the transmission cycle setting unit 43 compares the data storage cycle C with the transmission cycle P. When the data storage cycle C is shorter than the transmission cycle, the transmission cycle setting unit 43 changes the transmission cycle P to a cycle shorter than the data storage cycle C. In the example depicted in FIG. 10, since the data storage cycle C is shorter than the transmission cycle P, the transmission cycle setting unit 43 changes the transmission cycle P from "125 ms" to "62.5 ms". Hereinafter, the transmission cycle P changed by the transmission cycle setting unit 43 is also referred to as an "adjusted cycle P1".

The transmission cycle setting unit 43 notifies the transmission processing unit 41 and the transmission time setting unit 42 of the adjusted cycle P1. The transmission processing unit 41 performs the transmission process S at the adjusted cycle P1 indicated by the transmission cycle setting unit 43 until the corrected transmission time tm2 reaches the reference time t0.

The transmission time setting unit 42 corrects the transmission time tm using the adjusted cycle P1 indicated by the transmission cycle setting unit 43.

More specifically, the transmission time setting unit 42 refers to the table D stored in the storage unit 33 and acquires the split time difference Ts corresponding to the adjusted cycle P1. Here, the split time difference Ts is −50 milliseconds.

The transmission time setting unit 42 corrects the transmission time tm to be included in the follow-up message in the transmission process S performed immediately after the reference time t0 fluctuates by −5 seconds, i.e., when the reference time t0 is "5.0625 s", to the corrected transmission time tm2. Here, the corrected transmission time tm2 is "10.0125 s", which is the time obtained by adding "62.5 ms", which is the adjusted cycle P1, and "−50 ms", which is the split time difference Ts, to "10.000 s", which is the previous transmission time tm1. The transmission time setting unit 42 sets the corrected transmission time tm2 as the transmission time tm to be included in the follow-up message in the transmission process S.

The switch apparatus 111 performs time synchronization based on the follow-up message received from the master function unit 121 and including the corrected transmission time tm2. As a result, the time t1 at the switch apparatus 111 changes to "10.0125 s". Also, the end function unit 131 performs time synchronization based on the follow-up message received from the switch apparatus 111. As a result, the time t3 of the end function unit 131 changes to "10.0125 s".

When the transmission time setting unit 42 corrects the transmission time tm to "10.0125 s" and corrects the transmission time tm to "10.0250 s", the time t1 at the switch apparatus 111 and the time t3 at the end function unit 131 change to "10.0250 s". Thereafter, when the transmission time setting unit 42 corrects the transmission time tm to "10.100 s", the time t1 at the switch apparatus 111 and the time t3 at the end function unit 131 change to "10.100 s", which is a data storage time. Therefore, the switch apparatus 111 and the end function unit 131 can store data at "10.100 s" as the timing next to "10.000 s", which is the previous data storage time.

On the other hand, if the data storage cycle C is greater than or equal to the transmission cycle P, the transmission cycle setting unit 43 does not change the transmission cycle P. Note that, if it is determined in advance that the data storage cycle C is greater than or equal to the transmission cycle P in the vehicle-mounted network 101, the master function unit 121 need not include the transmission cycle setting unit 43.

Flow of Operation

Figure 11:
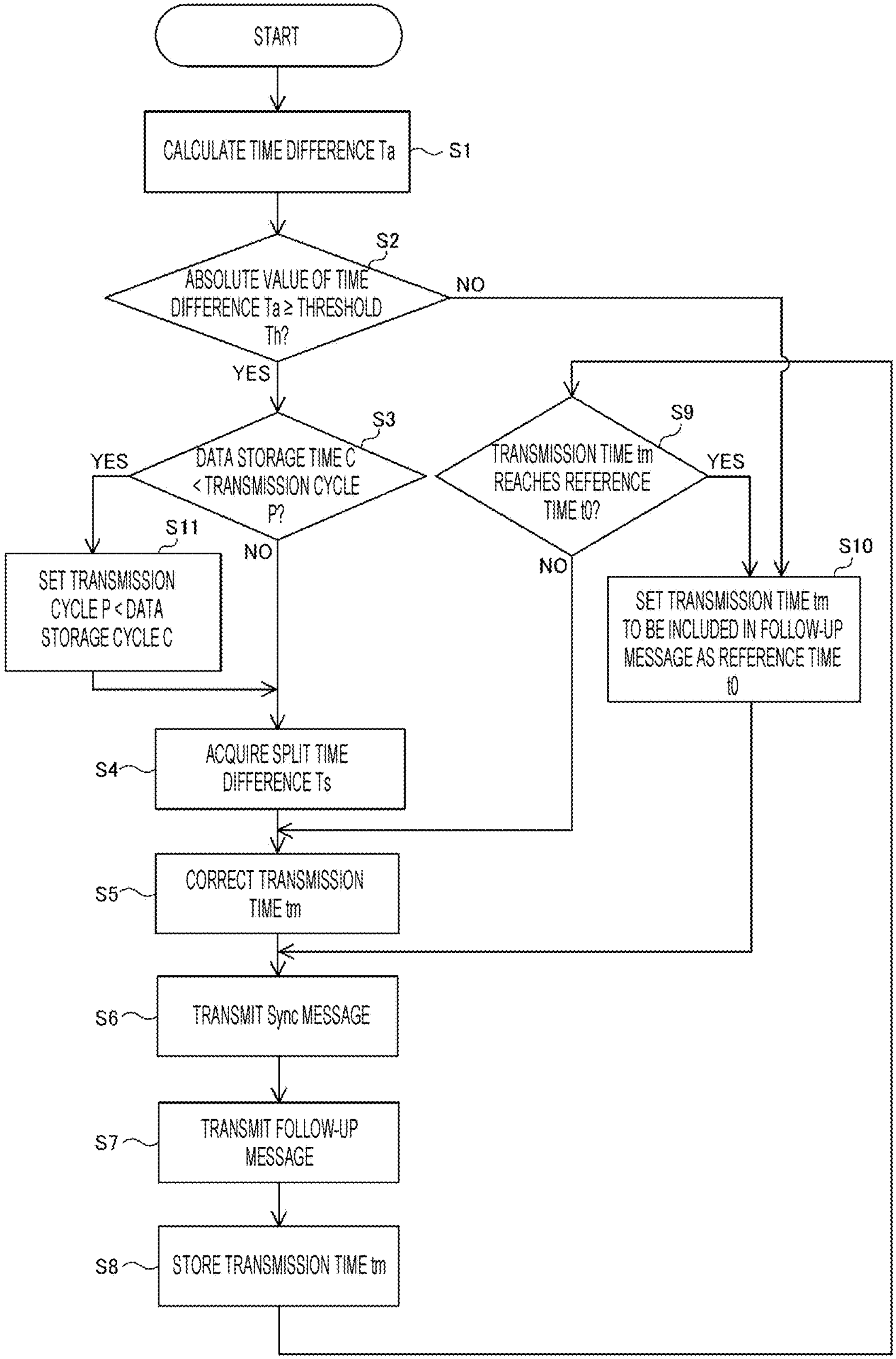
FIG. 11 is a flowchart defining an operation procedure when the master function unit according to an embodiment of the present disclosure performs a correction process of correcting the transmission time of the Sync message.

FIG. 11 is a flowchart defining an operation procedure when the master function unit according to an embodiment of the present disclosure performs a correction process of correcting the transmission time of the Sync message.

First, the master function unit 121 calculates the time difference Ta between the previous transmission time tm1 and the reference time t0, which indicates the current time at the master function unit 121 (step S1).

The master function unit 121 then compares the absolute value of the time difference Ta with the threshold Th (step S2).

If the absolute value of the time difference Ta is greater than or equal to the threshold Th ("YES" in step S2), the master function unit 121 compares the data storage cycle C with the transmission cycle P (step S3).

If the data storage cycle C is greater than or equal to the transmission cycle P ("NO" in step S3), the master function unit 121 does not change the transmission cycle P and acquires the split time difference Ts. As described above, the master function unit 121, for example, refers to the table D in the storage unit 33, and acquires the split time difference Ts according to the data storage cycle C (step S4).

The master function unit 121 then corrects the transmission time tm to be included in the follow-up message in the current transmission process S to a corrected transmission time tm2. As indicated in Formula (1) above, the corrected transmission time tm2 is the time obtained by adding the transmission cycle P and the split time difference Ts to the previous transmission time tm1 (step S5).

The master function unit 121 then transmits the Sync message to the switch apparatus 111 (step S6).

Then, the master function unit 121 transmits a follow-up message including the corrected transmission time tm2 to the switch apparatus 111 (step S7).

The master function unit 121 then stores the transmission time tm of the Sync message, i.e., the corrected transmission time tm2 (step S8).

In the next transmission process S, the master function unit 121 then compares the reference time t0 with the transmission time tm of the Sync message stored in the previous transmission process S (step S9).

If the transmission time tm of the Sync message has reached the reference time to ("YES" in step S9), the master function unit 121 sets the transmission time tm to be included in the follow-up message as the reference time t0 (step S10), and transmits the Sync message to the switch apparatus 111 (step S6).

On the other hand, if the transmission time tm has not reached the reference time to ("NO" in step S9), the master function unit 121 corrects the transmission time tm (step S5).

If the time difference Ta is less than the threshold Th ("NO" in step S2), the master function unit 121 sets the transmission time tm to be included in the follow-up message as the reference time t0 (step S10), and transmits the Sync message to the switch apparatus 111 (step S6).

Also, if the data storage cycle C is shorter than the transmission cycle P ("YES" in step S3), the master function unit 121 changes the transmission cycle P to a cycle shorter than the data storage cycle C (step S11), and acquires the split time difference Ts (step S4).

Figure 12:
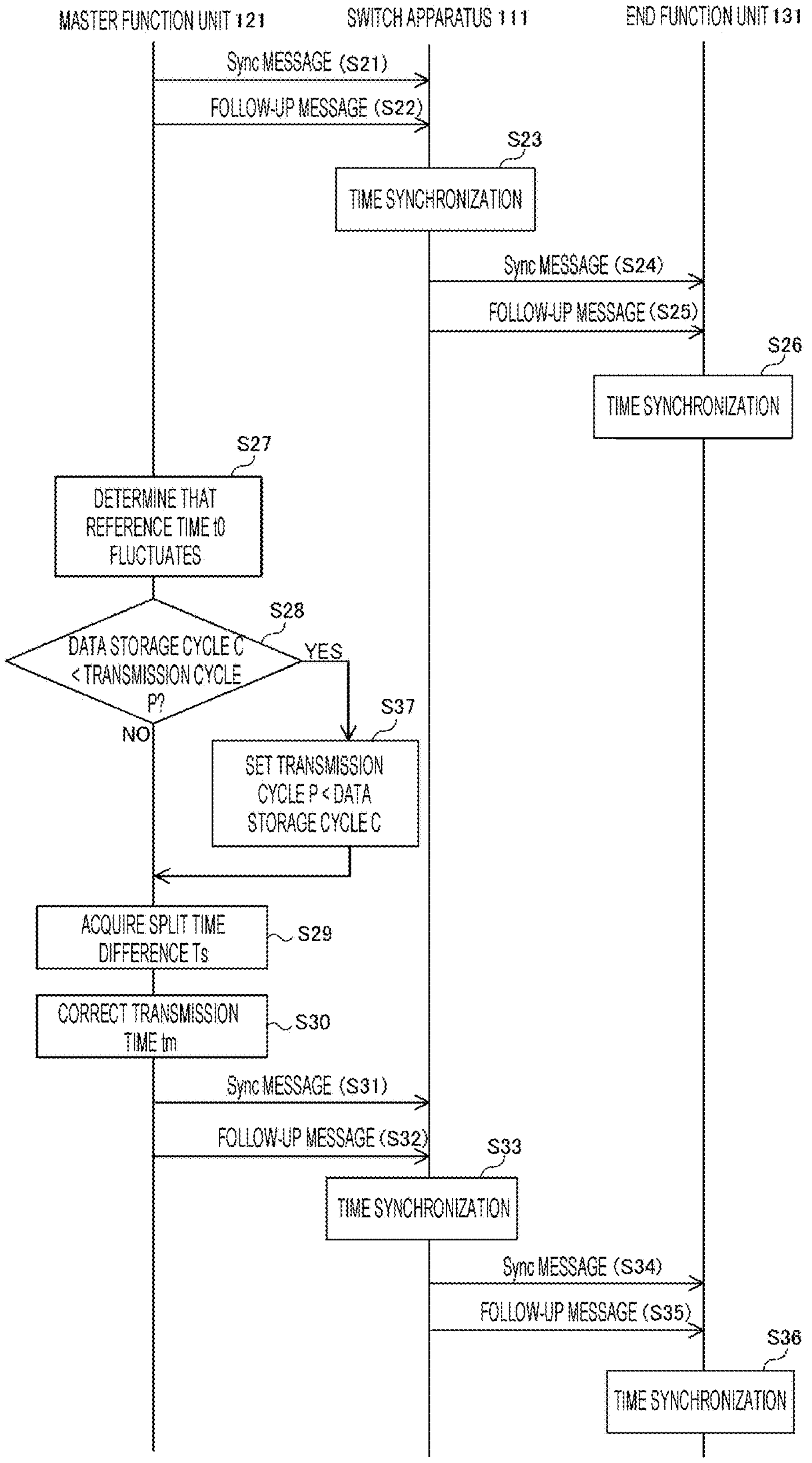
FIG. 12 depicts one example of a sequence of a process of time synchronization between vehicle-mounted apparatuses in the vehicle-mounted communication system according to an embodiment of the present disclosure.

FIG. 12 depicts one example of a sequence of a process of time synchronization between vehicle-mounted apparatuses in the vehicle-mounted communication system according to an embodiment of the present disclosure.

As depicted in FIG. 12, first, the master function unit 121 transmits a Sync message to the switch apparatus 111 (step S21).

Then, the master function unit 121 transmits a follow-up message including the transmission time tm of the Sync message to the switch apparatus 111. The master function unit 121 performs the transmission process S for transmitting the Sync message and the follow-up message to the switch apparatus 111 at the transmission cycle P (step S22).

After this, the switch apparatus 111 performs time synchronization with the master function unit 121 based on the Sync message and the follow-up message received from the master function unit 121 (step S23).

After this, the switch apparatus 111 transmits the Sync message received from the master function unit 121 to the end function unit 131 (step S24).

Next, the switch apparatus 111 further transmits the reception time of the Sync message included in the follow-up message received from the master function unit 121 to the end function unit 131 (step S25).

Thereafter, the end function unit 131 performs time synchronization with the switch apparatus 111 based on the Sync message and the follow-up message received from the switch apparatus 111 (step S26).

The master function unit 121 then monitors a time difference Ta between the reference time t0 and the transmission time tm included in the follow-up message in the previous transmission process S. The master function unit 121 determines that the reference time t0 has fluctuated when the absolute value of the time difference Ta is greater than or equal to the threshold Th (step S27).

The master function unit 121 then compares the data storage cycle C in the switch apparatus 111 and the end function unit 131 with the transmission cycle P (step S28).

If the data storage cycle C is greater than or equal to the transmission cycle P ("NO" in step S28), the master function unit 121 does not change the transmission cycle P and acquires the split time difference Ts. As described above, the master function unit 121, for example, refers to a table D in the storage unit 33, and acquires the split time difference Ts according to the data storage cycle C (step S29).

The master function unit 121 then corrects the transmission time tm to be included in the follow-up message in this transmission process S to a corrected transmission time tm2. As indicated in Formula (1) above, the corrected transmission time tm2 is the time obtained by adding the transmission cycle P and the split time difference Ts to the previous transmission time tm1 (step S30).

The master function unit 121 transmits a Sync message to the switch apparatus 111 (step S31).

Then, the master function unit 121 transmits a follow-up message including the corrected transmission time tm2 to the switch apparatus 111 (step S32).

The switch apparatus 111 performs time synchronization with the master function unit 121 based on the Sync message received from the master function unit 121 and the follow-up message including the corrected transmission time tm2 (step S33).

After this, the switch apparatus 111 transmits the Sync message received from the master function unit 121 to the end function unit 131 (step S34).

Next, the switch apparatus 111 further transmits the reception time of the Sync message included in the follow-up message received from the master function unit 121 to the end function unit 131 (step S35).

Thereafter, the end function unit 131 performs time synchronization with the switch apparatus 111 based on the Sync message received from the switch apparatus 111 and the follow-up message including the corrected transmission time tm2 (step S36).

On the other hand, if the data storage cycle C is shorter than the transmission cycle P ("YES" in step S28), the master function unit 121 sets the transmission cycle P to an adjusted cycle P1, which is shorter than the data storage cycle C (step S37), and acquires the split time difference Ts (step S29).

All features of the embodiments disclosed here are exemplary and should not be regarded as limitations on the present disclosure. The scope of the present invention is indicated by the scope of the claims rather than by the meaning of the above description, and all modifications that come within the meaning and scope equivalent to the claims are intended to be embraced therein.

Each process (that is, each function) in the embodiments described above is realized by a processing circuit including one or a plurality of processors. Such a processing circuit may be configured as an integrated circuit or the like in which one or a plurality of memories, various analog circuits, and various digital circuits are combined in addition to the one or plurality of processors. The one or plurality of memories store programs (instructions) that cause the one or more processors to execute the respective processes described above. The one or plurality of processors may execute the respective processes described above according to such programs that have been read from the one or plurality of memories, or may execute the processes described above according to a logic circuit designed in advance to execute such processes. The processors mentioned above may be any of a variety of processors that are suited to computer control, such as a CPU (Central Processing Unit), a GPU (Graphics Processing Unit), a DSP (Digital Signal Processor), an FPGA (Field Programmable Gate Array), and an ASIC (Application Specific Integrated Circuit). Note that the processors described above that are physically separated may cooperate with each other to execute the processes described above. As one example, processors installed in a plurality of physically separated computers may cooperate with each other via a network, such as a LAN (Local Area Network), a WAN (Wide Area Network), or the Internet, to execute the processes described above. The above programs may be installed into the memories mentioned above from an external server apparatus or the like via the network, or may be distributed having been stored on a recording medium such as a CD-ROM (Compact Disc Read Only Memory), a DVD-ROM (Digital Versatile Disk Read Only Memory), or a semiconductor memory and then installed from such recording medium into the memories.

The above description includes the following additional features.

APPENDIX 1

A vehicle-mounted apparatus including a processing circuit, in which the processing circuit performs a transmission process for transmitting, to another vehicle-mounted apparatus, first time synchronization information and second time synchronization information including a transmission time at which the first time synchronization information is transmitted, at a predetermined transmission cycle, and a correction process for correcting the transmission time in a current transmission process, based on a time difference between a current time at the vehicle-mounted apparatus and a previous transmission time, the previous transmission time being the transmission time in the previous transmission process, to a corrected transmission time obtained by adding, to the previous transmission time, the transmission cycle and a value obtained by splitting the time difference.

LIST OF REFERENCE NUMERALS

1 Vehicle
10 Ethernet cable
11 Relay unit
12, 32, 52 Time synchronization unit
13, 33, 53 Storage unit
14, 14A, 14B, 34, 54 Communication port
21 Switch unit
22 Information processing unit
31, 51 Communication unit
41 Transmission processing unit
42 Transmission time setting unit
43 Transmission cycle setting unit
101 Vehicle-mounted network
111 Switch apparatus
121 Master function unit
131 End function unit
301 Vehicle-mounted communication system

What is claimed is:

1. A vehicle-mounted apparatus comprising:
a transmission processing circuit unit configured to perform a transmission process for transmitting, to another vehicle-mounted apparatus, first time synchronization information and second time synchronization information including a first transmission time at which the first time synchronization information is transmitted, at a predetermined transmission cycle; and
a correction circuit configured to perform a correction process for correcting the first transmission time to be included in the second time synchronization information in a current transmission process, based on a time difference between a current time at the vehicle-mounted apparatus and a previous transmission time, the previous transmission time being the first transmission time in the previous transmission process, to a corrected transmission time obtained by adding, to the previous transmission time, the transmission cycle and a value obtained by splitting the time difference.

2. The vehicle-mounted apparatus according to claim 1, wherein the correction circuit unit performs the correction process when an absolute value of the time difference is a predetermined threshold or more.

3. The vehicle-mounted apparatus according to claim 2, further comprising
an acquisition circuit configured to acquire a data storage cycle at which data is stored in the other vehicle-mounted apparatus,
wherein the threshold is determined based on the data storage cycle acquired by the acquisition circuit and the transmission cycle.

4. The vehicle-mounted apparatus according to claim 3, further comprising a transmission cycle setting circuit configured to change the transmission cycle to an adjusted cycle shorter than the data storage cycle when the data storage cycle is shorter than the transmission cycle, wherein the transmission processing circuit performs the transmission process at the adjusted cycle until the corrected transmission time reaches the current time.

5. A time synchronization method for a vehicle-mounted apparatus, the method comprising:

a step of performing a transmission process for transmitting, to another vehicle-mounted apparatus, first time synchronization information and second time synchronization information including a first transmission time at which the first time synchronization information is transmitted, at a predetermined transmission cycle; and a step of performing a correction process for correcting the first transmission time to be included in the second time synchronization information in a current transmission process, based on a time difference between a current time at the vehicle-mounted apparatus and a previous transmission time, the previous transmission time being the first transmission time in the previous transmission process, to a corrected transmission time obtained by adding, to the previous transmission time, the transmission cycle and a value obtained by splitting the time difference.

6. A non-transitory computer-readable medium storing a time synchronization program for use in a vehicle-mounted apparatus, the program causing a computer to function as a transmission processing circuit configured to perform a transmission process for transmitting, to another vehicle-mounted apparatus, first time synchronization information and second time synchronization information including a first transmission time at which the first time synchronization information is transmitted, at a predetermined transmission cycle, and a correction circuit configured to perform a correction process for correcting the first transmission time to be included in the second time synchronization information in a current transmission process, based on a time difference between a current time at the vehicle-mounted apparatus and a previous transmission time, the previous transmission time being the first transmission time in the previous transmission process, to a corrected transmission time obtained by adding, to the previous transmission time, the transmission cycle and a value obtained by splitting the time difference.

* * * * *